B. S. Benson,
Hydraulic Ram,
N° 4,328.   Patented Dec. 26, 1845.
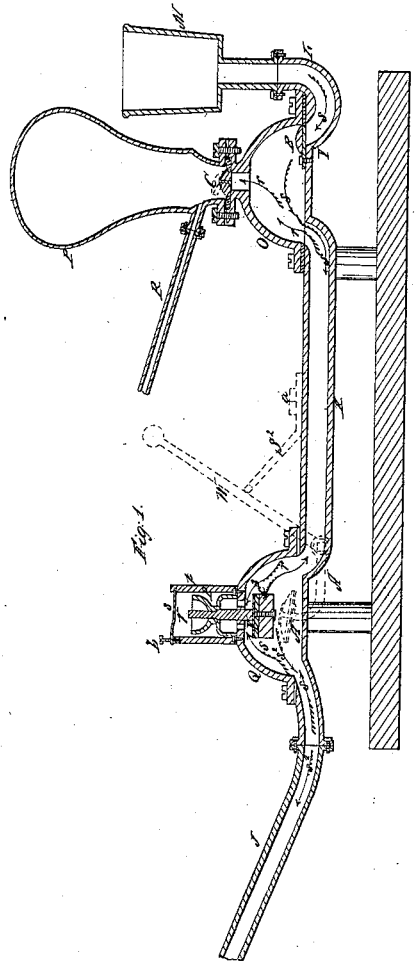
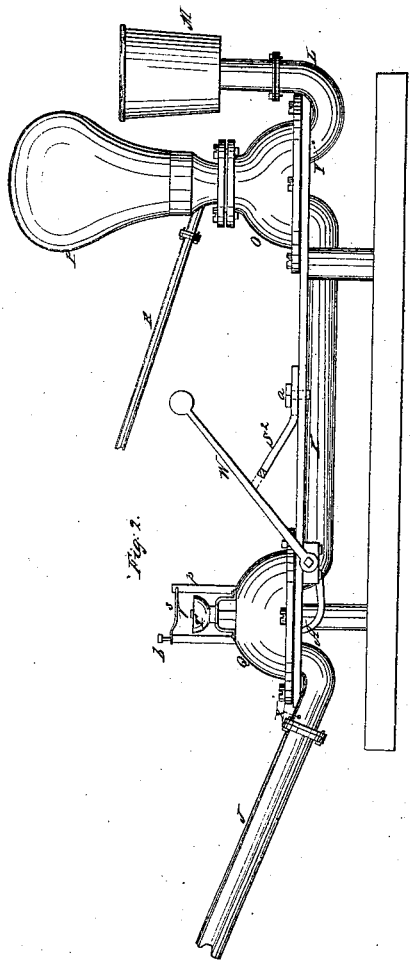
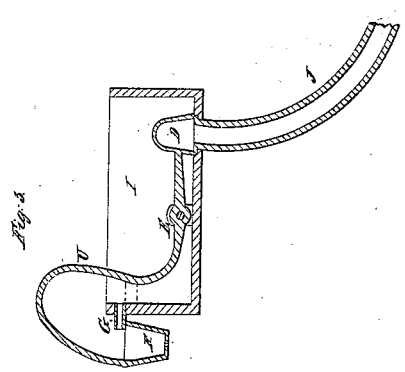

*Sheet 2 - 2 Sheets*
B. S. Benson,
Hydraulic Ram,
N° 4,328.                          Patented Dec. 26, 1845.
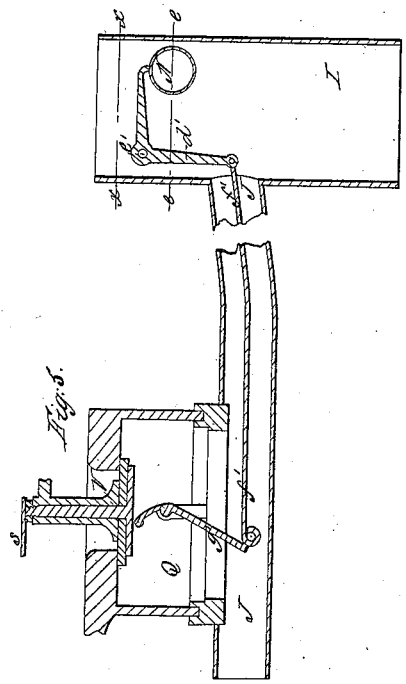
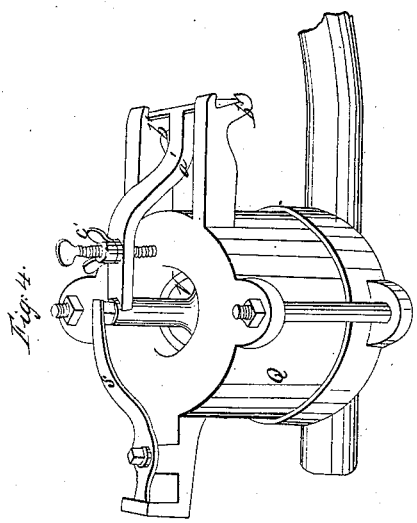

UNITED STATES PATENT OFFICE.

BENJN. S. BENSON, OF HARFORD COUNTY, MARYLAND.

HYDRAULIC RAM.

Specification of Letters Patent No. 4,328, dated December 26, 1845; Antedated August 5, 1845.

*To all whom it may concern:*

Be it known that I, BENJAMIN S. BENSON, of Harford county, State of Maryland, have invented a new and useful Machine for raising Spring-Water by the Momentum of a Descending Fluid in Contact Therewith; which is described as follows, reference being had to the annexed drawings of the same, making part of this specification.
Figure 1 is a vertical longitudinal section. Fig. 2 is a side elevation of the machine. Fig. 3 is a longitudinal section of the reservoir I.

My improvement consists in the raising of spring water from a lower to a higher level by the motive power of river, or branch water, taken from a lower level than that to which the spring water is to be elevated. Branch or river water has been used as a motive power to elevate spring water by other machinery than the water ram. The operation of the water ram heretofore has been to raise a portion of the same water that operated as a motive power in the machine. Under some circumstances it is considered an advantage to throw up more of the water afforded by a spring or springs at command than could be done by using a portion of the spring water as a motive power;
consequently it would be advantageous to use branch or other water that might be at command. Under such circumstances the water ram is used with greater advantage for raising water than any other known apparatus, on account of its great simplicity and economy of motive power. The advantage of using the branch water in combination with the spring water as a motive power for raising a portion of the spring water has not before been had.

Description of the machine by which this effect is produced: I is a reservoir containing the water or propelling fluid placed above the level of the discharge valve V; J is a pipe leading from the bottom of the reservoir I to the water chamber Q; K is a second or additional pipe leading from the water chamber Q to a second water chamber O for containing the fresh water to be raised; L is a third pipe leading from the chamber O to the reservoir M containing the fresh or pure water to be raised, conveyed by said pipe L from said reservoir to said water chamber. The chamber O may be made of a semi-globular, or other convenient, form. The chamber Q may be made of the same or other form; V is a puppet valve, or waste valve, for letting off the waste water at the proper time; and for shutting off the escape of the water as the water flows from the reservoir I through pipe J when it receives an impetus as it passes by said valve V and rams or drives the column of spring water in pipe K against a continuation of the column of water and forces it through chamber O into chamber P. P is an air chamber placed over the second chamber O for containing air to act on the water as a spring in the usual manner.

C is a valve in the bottom of or at the base of the air vessel C for holding the water that is forced into the air vessel.

R is the discharge pipe for conveying and discharging the fresh water.

B is a valve in the second chamber O aforesaid over the mouth of the pipe L for preventing the return of the spring water through said pipe L into the reservoir M.

Y is a small perforation in pipe L to admit air.

D is a valve attached to the end of a vibrating lever U that vibrates on a fulcrum E; and F is a bucket perforated in the bottom with a small aperture for the gradual escape of the water and G is a pipe for conducting the water to the bucket.

Operation: The pipes J and K being filled with river or other water from reservoir I which presses on the valves V and B and closes them; the valve V is then opened by the operator which causes the water to flow freely from the reservoirs I and M through the pipes J, K and L in the direction of the arrows and through the valve V to the waste conduit. The accelerated velocity of the water in passing through the puppet valve V producing increased momentum closes it; and then causes the column of water flowing from the reservoir I to have a pressure, by its impetus or momentum, on the column of fresh water in the pipe K, forcing it to take the direction indicated by the arrows $r$ and to rise and pass the valve C, into the air chamber P, and then through the discharge pipe R. The elasticity of the air in the vessel P causes the water to flow in the pipes J and K in the direction of the arrows S and $S^2$ and to close the valve C which causes a partial vacuum in the chambers O and Q which relieves the valves B and V of pressure—the said vacuum and spring over the valve V causing it to open. The water then flows from the reservoirs I and M in the manner before described; and in this manner the action of the machine is continued.

The operation of the apparatus for preventing the branch water in reservoir I descending below the level of the pipe G is described as follows: When the water has run out of the bucket F through the small aperture in the bottom of the same which it will do when it ceases to flow through the pipe G by the descent of the water in the reservoir the valve D will then preponderate and close the opening over the mouth of the pipe J and shut off the flow of the water through pipe J and cause the action of the machine to stop. The water continues to flow into the reservoir I until it again rises to the level of the pipe G, it then flows through said pipe G into the bucket F and fills it as aforesaid causing the end of the lever U to which the bucket is attached to preponderate and the lever U to vibrate and the valve D to open and the machine to resume its operation as aforesaid. By this arrangement the valve D is always kept surrounded by water which prevents the entrance of the air into pipe J and the consequent entire stoppage of the machine.

The machine being once started by opening the valves and a proper supply of water being kept up will need no personal attention as long as the machine remains in order. The spring $s$ is placed above the stem of the valve $v$. It is let into a post $p$ at one end; and at the other end it moves over a screw bolt $b$ inserted into another post for preventing it rising too high—the said spring having an oblong opening in it for that purpose. The spring $s$ however may be arranged in any convenient manner.

The action of the spring $s$ is as follows: When the velocity of the water in passing by said valve raises it the stem is forced upward against the spring which is partly contracted thereby. Then when the pressure on the valve is relieved by the partial vacuum created in chamber Q as aforesaid, the pressure of the atmosphere, aided by said spring will cause the valve to descend and open.

What I claim as my invention and desire to secure by Letters Patent is—

1. Raising spring water to a higher level than its source by the momentum of a running stream of river, or other water in contact therewith, in a double ram constructed as aforesaid, or other ram, constructed and combined substantially in the manner set forth, by which analogous results are produced—the two rams being united by an additional pipe K in which the spring and river water come in contact as above set forth.

2. I also claim the combination and arrangement of the lever U, bucket F, and valve D with the reservoir I as described for keeping up the action of the machine.

3. I likewise claim the arrangement of the spring $s$ for insuring the opening of the valve V as described.

BENJAMIN S. BENSON.

Witnesses:
　Wm. P. Elliot,
　Albert E. H. Johnson.